US012716564B2

(12) United States Patent
Kim

(10) Patent No.: US 12,716,564 B2
(45) Date of Patent: Aug. 25, 2026

(54) VEHICLE LIGHTING APPARATUS

(71) Applicant: HYUNDAI MOBIS CO., LTD., Seoul (KR)

(72) Inventor: Min Ji Kim, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 0 days.

(21) Appl. No.: 19/339,578

(22) Filed: Sep. 25, 2025

(65) Prior Publication Data

US 2026/0194197 A1 Jul. 9, 2026

(30) Foreign Application Priority Data

Jan. 7, 2025 (KR) ........................ 10-2025-0002064

(51) Int. Cl.

| | |
|---|---|
| ***F21S 41/275*** | (2018.01) |
| ***F21S 41/151*** | (2018.01) |
| ***F21S 41/20*** | (2018.01) |
| ***F21S 41/32*** | (2018.01) |
| *F21W 102/10* | (2018.01) |
| *F21Y 115/10* | (2016.01) |

(52) U.S. Cl.

CPC ........... *F21S 41/275* (2018.01); *F21S 41/151* (2018.01); *F21S 41/2805* (2024.05); *F21S 41/285* (2018.01); *F21S 41/32* (2018.01); *F21W 2102/10* (2018.01); *F21Y 2115/10* (2016.08)

(58) Field of Classification Search

CPC ...... F21S 41/275; F21S 41/151; F21S 41/285; F21S 41/32; F21S 41/2805; F21Y 2115/10; F21W 2102/10

See application file for complete search history.

(56) References Cited

U.S. PATENT DOCUMENTS

| | | | | |
|---|---|---|---|---|
| 11,421,849 | B2 * | 8/2022 | Kim | F21S 43/26 |
| 2019/0101259 | A1 * | 4/2019 | Nykerk | F21S 43/26 |
| 2021/0207784 | A1 * | 7/2021 | Chen | F21S 41/25 |
| 2022/0128213 | A1 * | 4/2022 | Kim | F21S 43/26 |
| 2023/0058495 | A1 * | 2/2023 | Kim | F21S 41/265 |

* cited by examiner

*Primary Examiner* — Bao Q Truong

(74) *Attorney, Agent, or Firm* — NSIP Law

(57) ABSTRACT

A vehicle lighting apparatus and a system therefor are provided. The vehicle lighting apparatus includes a lenticular device, an inner lens disposed in front of the lenticular device and inclined with respect to the lenticular device, and a reflector disposed on a lower side of the lenticular device and the inner lens. The lenticular device, the inner lens, and the reflector are arranged in a triangular shape.

10 Claims, 3 Drawing Sheets

VEHICLE LIGHTING APPARATUS

CROSS-REFERENCE TO RELATED APPLICATION

This application claims priority to and the benefit under 35 USC § 119(a) of Korean Patent Application No. 10-2025-0002064, filed on Jan. 7, 2025, in the Korean Intellectual Property Office, the disclosure of which is incorporated herein by reference in its entirety for all purposes.

BACKGROUND

1. Field of the Invention

The present invention relates to a vehicle lighting apparatus.

2. Description of the Related Art

In recent years, research has been continuously conducted to improve vehicle design to enhance vehicle marketability. Among them, demand for improving vehicle design through vehicle lamps is increasing.

As elements for improving the design through vehicle lamps, an optical system or elements linked to the optical system are needed, and among them, there have been ongoing attempts to diversify the design through light refraction using a lenticular lens.

However, since optical design content using lenticular technology is limited to light refractive elements due to the structural characteristics of the lenticular lens applied to the lamp, there are limitations in attempts to improve the design.

Therefore, there is an increasing need to improve the design of vehicles, and more specifically, discover new designs through the presentation of three-dimensional light designs or lighting designs in both unlit and lit states, in addition to the lenticular structure.

SUMMARY

The present invention is directed to providing an improved vehicle lighting apparatus capable of implementing a vehicle lighting design pattern together with a lenticular structure.

In a general aspect, a vehicle lighting apparatus includes: a lenticular device; an inner lens disposed in front of the lenticular device and inclined with respect to the lenticular device; and a reflector disposed on a lower side of the lenticular device and the inner lens, wherein the lenticular device, the inner lens, and the reflector are arranged in a triangular shape.

A plurality of pattern portions spaced apart at predetermined intervals may be disposed on the inner lens.

The plurality of pattern portions may be formed on the inner lens by etching treatment.

The lenticular device may include: a lens portion including a convex portion in which a plurality of convex shapes are continuously arranged and a flat portion disposed on one side of the convex portion; and a film portion disposed on the lens portion and configured to form at least one or more images that are alternatively arranged.

The vehicle lighting apparatus may further include a light source including a first light source portion disposed at the rear of the lenticular device and a second light source portion disposed on an upper side of the inner lens, wherein, when light is not generated by the light source, an unlit shape is implemented through the vehicle lighting apparatus, and wherein, when light is generated by the light source, at least one or more lit shapes are implemented through the vehicle lighting apparatus.

The reflector may be configured to illuminate at least one or more images of the film portion of the lenticular device.

The vehicle lighting apparatus may further include a housing configured to accommodate the lenticular device, the inner lens, the reflector, and the light source therein, wherein the housing includes a first frame portion disposed parallel to the lenticular device, a second frame portion disposed parallel to the reflector, and a third frame portion disposed on an upper side of the first frame portion and configured to accommodate the second light source portion of the light source therein.

The vehicle lighting apparatus may further include an outer lens disposed in front of the inner lens and the housing, and disposed parallel to the inner lens.

In another general aspect, a vehicle lighting apparatus includes: a lenticular device; an inner lens disposed in front of the lenticular device and inclined with respect to the lenticular device; a reflector disposed on a lower side of the lenticular device and the inner lens; and a light source including a first light source portion disposed at the rear of the lenticular device and a second light source portion disposed on an upper side of the inner lens, wherein, when light is not generated by the light source, an unlit shape is implemented by the lenticular device, the inner lens, and the reflector, and wherein, when light is generated by the light source, one or more lit shapes are implemented by the lenticular device, the inner lens, and the reflector.

The unlit shape or the one or more lit shapes may be formed in a shape having at least two or more inclination angles.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION

Figure 1A:
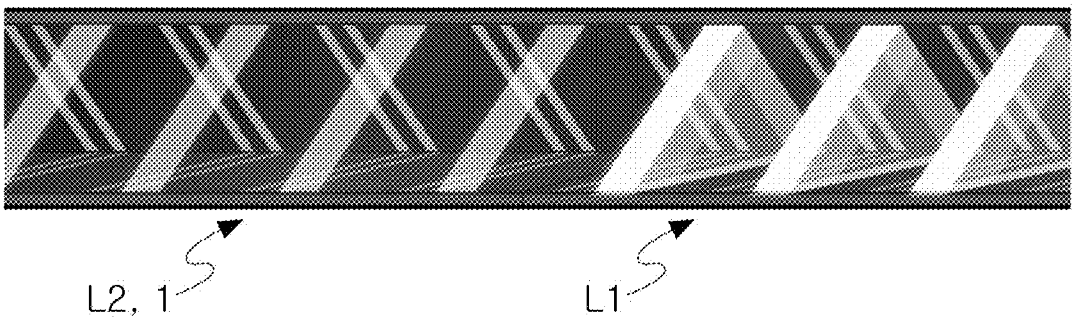
FIG. 1A is a view showing a main lamp and a sub-lamp.

Since the present invention may be variously modified and embodied, particular embodiments thereof will be illustrated in the drawings and described. However, this is not intended to limit the present invention to the specific embodiments, and it should be understood to include all modifications, equivalents, and substitutes included in the spirit and scope of the present invention.

Although the terms including ordinal numbers such as first, second, or the like, may be used to describe various elements, these elements are not limited by these terms. These terms are only used to distinguish one element from another element. For example, without departing from the scope of the present invention, a second element could be termed a first element, and similarly, a first element could be termed a second element. The term "and/or" includes a combination of a plurality of related listed items or any of a plurality of related listed items.

It will be understood that when an element is referred to as being "coupled" or "connected" to another element, the element may be directly coupled or connected to the other element, or intervening elements may also be present. In contrast, it will be understood that when an element is referred to as being "directly coupled" or "directly connected" to another element, there are not intervening elements present.

In the description of embodiments, when one element is described as being formed "on" or "under" another element, "on" or "under" includes both a case in which the two elements are directly in contact with each other and a case in which at least one additional element is formed to be disposed between the two elements (indirectly). Further, when expressed as "on or under", the expression may include the meaning of not only an upward direction but also a downward direction based on one element.

The terms used in the present application are merely provided to describe specific embodiments, and are not intended to limit the present invention. The singular forms are intended to include the plural forms as well, unless the context clearly indicates otherwise. In the present application, it will be understood that terms "include," "have," or the like are intended to specify the presence of features, integers, steps, operations, elements, components, and/or combinations thereof stated in the specification, but do not preclude the possibility of the presence or addition of one or more other features, integers, steps, operations, elements, components, or combinations thereof in advance.

Unless otherwise defined, all terms used herein, including technical or scientific terms, have the same meaning as commonly understood by those of ordinary skill in the art to which the present invention belongs. Terms, such as those defined in commonly used dictionaries, should be interpreted as having a meaning that is consistent with their meaning in the context of the related art and will not be interpreted in an idealized or overly formal sense unless expressly so defined herein.

Hereinafter, a vehicle lighting apparatus will be described in detail with reference to the accompanying drawings, but identical or corresponding components are denoted by the same reference numerals regardless of figure numbers, and redundant descriptions thereof will be omitted.

Figure 1B:
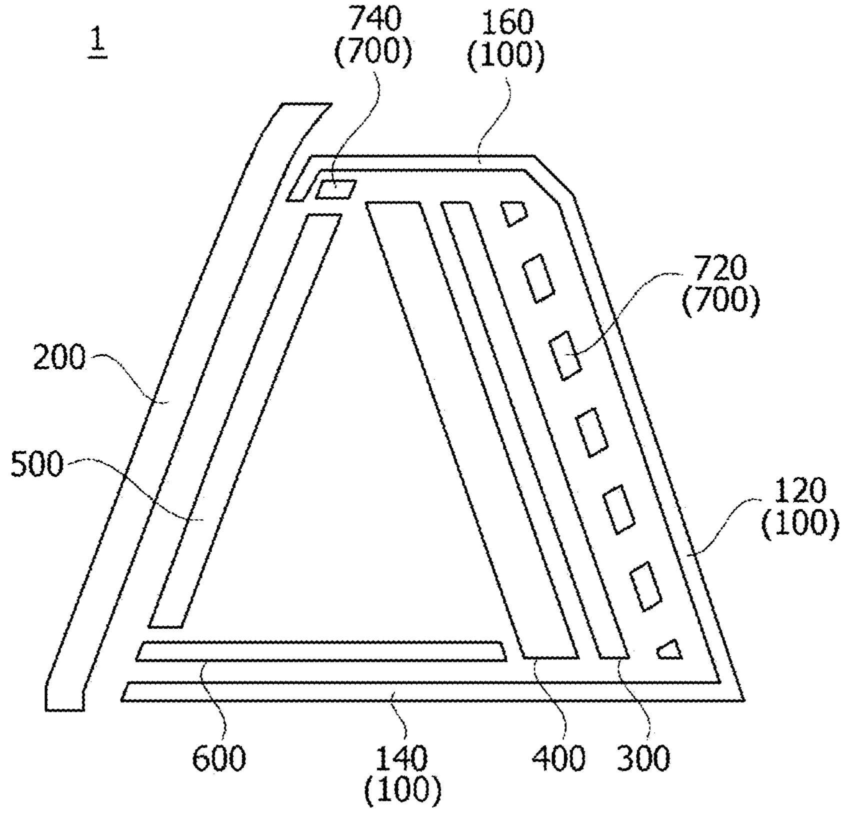
FIG. 1B is a view schematically illustrating a vehicle lighting apparatus according to one embodiment of the present invention.
Figure 2A:
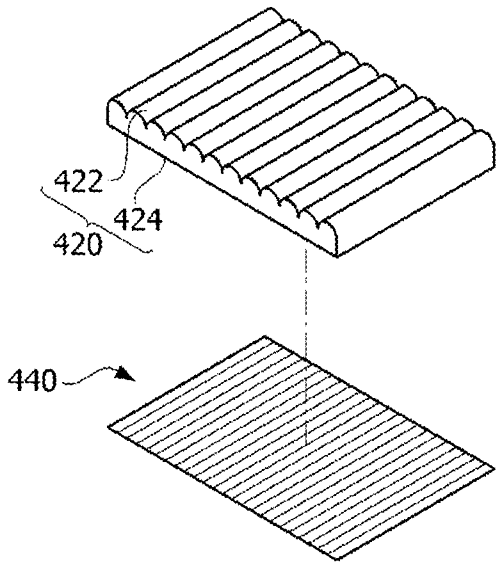
FIG. 2A is an exploded perspective view of a lenticular unit.
Figure 2B:
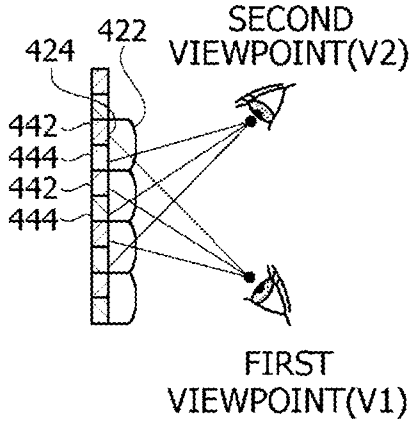
FIG. 2B is a view showing the lenticular unit as viewed from a first viewpoint and a second viewpoint.

FIG. 1A is a view showing a main lamp and a sub-lamp, FIG. 1B is a view schematically illustrating a vehicle lighting apparatus according to one embodiment of the present invention, FIG. 2A is an exploded perspective view of a lenticular unit, and FIG. 2B is a view showing the lenticular unit as viewed from a first viewpoint and a second viewpoint.

Referring to FIG. 1A, a vehicle lighting apparatus 1 according to one embodiment of the present invention may be a part of components of a headlight (not shown) installed at the front of a vehicle. The headlight may include a main lamp L1 and a sub-lamp L2, and among them, the vehicle lighting apparatus 1 described in the present invention may relate to the sub-lamp L2. The vehicle lighting apparatus 1 may be disposed on one side of the main lamp L1. In the present embodiment, it is exemplified that the vehicle lighting apparatus 1 is the sub-lamp L2, but it is not limited thereto. In addition, in the present embodiment, it is exemplified that the vehicle lighting apparatus 1 is a part of the components of the headlight, but the present embodiment is not limited thereto. The vehicle lighting apparatus 1 may be an independent lighting apparatus used in the vehicle.

Referring to FIG. 1B, the vehicle lighting apparatus 1 may include a housing 100, an outer lens 200, a diffusion lens 300, a lenticular unit 400 (e.g., a lenticular device), an inner lens 500, a reflector 600, and a light source unit 700 (e.g., a light source). The light source unit 700 may be controlled by a controller (e.g., a processor) to turn on or turn off. A disposition structure of each component of the vehicle lighting apparatus 1 described below will be described based on FIG. 1B.

The housing 100 may accommodate the diffusion lens 300, the lenticular unit 400, the inner lens 500, the reflector 600, and the light source unit 700 therein. The housing 100 may include a first frame portion 120, a second frame portion 140, and a third frame portion 160.

The first frame portion 120 may be disposed parallel to the diffusion lens and the lenticular unit 400. The first frame portion 120 may support the second frame portion 140 and the third frame portion 160.

The second frame portion 140 may be disposed parallel to the reflector 600. The second frame portion 140 may protrude from one end of the first frame portion 120 and have a shape that is bent from the first frame portion 120. The second frame portion 140 may support the diffusion lens 300, the lenticular unit 400, the reflector 600, and a first light source portion 720 of the light source unit 700, which will be described below.

The third frame portion 160 may be disposed on an upper side of the first frame portion 120, and may accommodate a second light source portion 740 of the light source unit 700, which will be described below, therein. The third frame portion 160 may protrude from the other end of the first frame portion 120 opposite the one end, and may have a shape that is bent from the first frame portion 120.

The end of the third frame portion 160 may have a shape that is bent toward the outer lens 200. This forms a space in which the second light source portion 740 of the light source unit 700, which will be described below, is disposed, and is to ensure that the light generated from the second light source portion 740 is directed toward the inner lens 500 rather than toward the outer lens 200.

The outer lens 200 may be disposed in front of the inner lens 500 and the housing 100. The outer lens 200 may be disposed parallel to the inner lens 500. The outer lens 200 as described above may be made of a material that may transmit light. In addition, the outer lens 200 may be made of a transparent material so that the components inside the housing 100 may be seen.

The diffusion lens 300 may be disposed in front of the first light source portion 720 of the light source unit 700, which will be described below. In addition, the diffusion lens 300 may be disposed between the first light source portion 720 of the light source unit 700 and the lenticular unit 400. The diffusion lens 300 may be made of a material that transmits light. The diffusion lens 300 may be a lens that diffuses light generated from the first light source portion 720 of the light source unit 700. The diffusion lens 300 may be disposed parallel to the first frame portion 120 of the housing 100 or the lenticular unit 400.

The lenticular unit 400 may be disposed in front of the diffusion lens 300. The lenticular unit 400 may be disposed between the diffusion lens 300 and the inner lens 500. The lenticular unit 400 may include a lens portion 420 and a film portion 440.

Referring to FIG. 2A, the lens portion 420 may include a convex portion 422 in which a plurality of convex shapes are continuously arranged and a flat portion 424 disposed on one side of the convex portion 422. Here, the convex portion 422 may be disposed toward the inner lens 500, and the flat portion 424 may be disposed toward the diffusion lens 300. The lens portion 420 may provide various pieces of visual information by causing a refraction phenomenon of light.

Referring to FIG. 2B, the film portion 440 may be disposed on the flat portion 424 of the lens portion 420. The film portion 440 may be disposed between the diffusion lens 300 and the lens portion 420 (see FIG. 1B). In order to allow at least two images to be implemented, the film portion 440 may divide two images and then continuously and alternately arrange the two divided images (a first image 442 and a second image 444) to implement the shape thereof. That is, the film portion 440 may form at least one or more images that are alternatively arranged. In addition, the film portion 440 may be made of a material that may transmit light.

The lenticular unit 400 as described above may allow different images to be seen depending on the viewing point, as shown in FIG. 2B. More specifically, when light generated from the first light source portion 720 of the light source unit 700, which will be described below, passes through the diffusion lens 300 and then the lenticular unit 400, a first image 442 may be seen as viewed from a first viewpoint V1, and a second image 444 may be seen as viewed from a second viewpoint V2.

The inner lens 500 may be disposed in front of the lenticular unit 400. The inner lens 500 may be disposed between the lenticular unit 400 and the outer lens 200. The inner lens 500 may be disposed to be inclined with respect to the lenticular unit 400.

The inner lens 500 may be disposed on the upper side of the reflector 600. The inner lens 500 may transmit light reflected by the reflector 600 after passing through the lenticular unit 400 or transmit light that has passed through the lenticular unit 400. The inner lens 500 may include a main body 520 and a pattern portion 540.

The main body 520 may form the exterior of the inner lens 500. The main body 520 may be disposed in a direction in which the outer lens 200 is disposed. The main body 520 may be disposed parallel to the outer lens 200.

Figure 3:
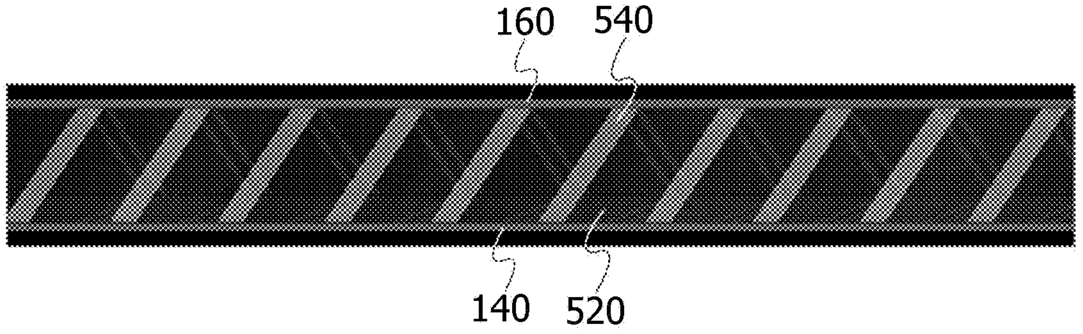
FIG. 3 is a view showing an unlit state of the vehicle lighting apparatus.

The pattern portion 540 may be formed on the main body 520 (see FIG. 3). Here, the pattern portion 540 may be formed on a surface of the main body 520 facing the outer lens 200, but is not limited thereto. A plurality of pattern portions 540 may be formed on the main body 520, and the plurality of pattern portions 540 may be spaced apart from each other at predetermined intervals.

The plurality of pattern portions 540 may be formed on the inner lens 500 by etching treatment. Accordingly, each of the plurality of pattern portions 540 may have a specific pattern or an unspecified pattern. In this way, when light passes through the inner lens 500, the patterns formed by etching treatment are visible to people looking at the vehicle through the outer lens 200, and in this case, since the patterns formed by etching treatment add design diversity, the patterns may serve as an element that enhances the vehicle design characteristics. Therefore, the plurality of pattern portions 540 that have undergone etching treatment may be one of the elements that may improve the marketability of the vehicle. In the present embodiment, the plurality of pattern portions 540 are exemplified as being formed by etching treatment, but are not limited thereto. The plurality of pattern portions 540 may be formed in various ways as long as the pattern portions 540 may be formed on the inner lens 500.

The reflector 600 may be disposed on a lower side of the lenticular unit 400 and the inner lens 500. The reflector 600 may be made of a material capable of reflecting light. For example, the reflector 600 may include a mirror, a reflective member made of chrome material, a member formed of a glossy material using a hi-glossy method, or the like.

The reflector 600 may illuminate at least one or more images of the film portion 440 of the lenticular unit 400. More specifically, in an unlit or lit state of the vehicle lighting apparatus 1, the reflector 600 may illuminate the first image 442 and the second image 444 of the film portion 440 projected through the lens portion 420 of the lenticular unit 400. This disposition structure of the reflector 600 may be one of the elements that evoke an aesthetic sense from the viewpoint of the outside of the vehicle, thereby improving the marketability of the vehicle.

The light source unit 700 is a component that generates light and may be a combination of a plurality of LEDs and a substrate that is connected to the LEDs to transmit a light generation signal. The light source unit 700 may include the first light source portion 720 disposed at the rear of the lenticular unit 400 and a second light source portion 740 disposed on the upper side of the inner lens 500. Here, the first light source portion 720 may be disposed at an angle corresponding to a disposition angle of the first frame portion 120 of the housing 100 or the diffusion lens 300, and may emit light toward the diffusion lens 300. In addition, the second light source portion 740 may be disposed in a bent region of the third frame portion 160 of the housing 100, and may emit light toward the inner lens 500.

Hereinafter, an unlit shape and a lit shape that may be implemented through a vehicle lighting apparatus 1 according to one embodiment of the present invention will be described.

Figure 4:
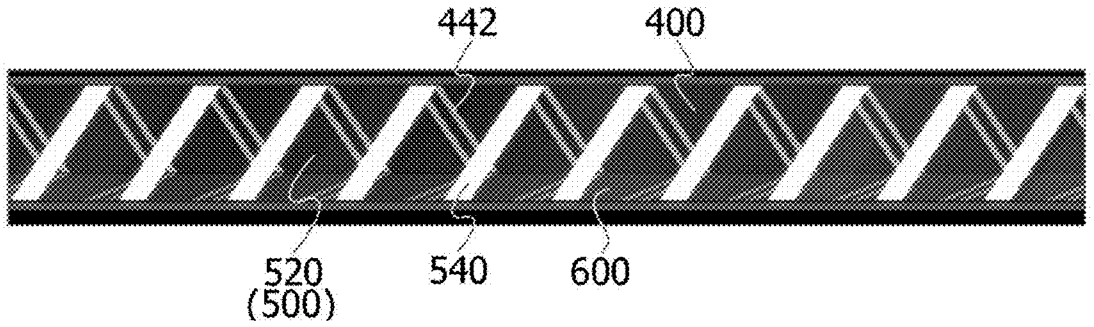
FIG. 4 is a view showing the vehicle lighting apparatus in a lit state as viewed from the first viewpoint.
Figure 5:
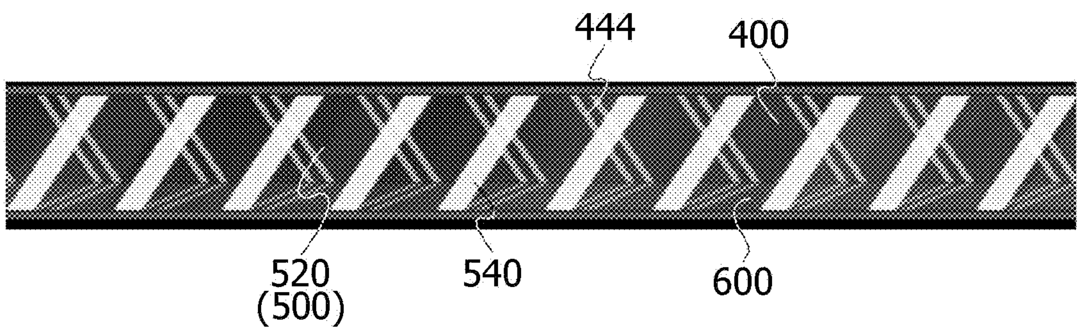
FIG. 5 is a view showing the vehicle lighting apparatus in a lit state as viewed from the second viewpoint.

FIG. 3 is a view showing an unlit state of the vehicle lighting apparatus, FIG. 4 is a view showing the vehicle lighting apparatus in a lit state as viewed from the first viewpoint, and FIG. 5 is a view showing the vehicle lighting apparatus in a lit state as viewed from the second viewpoint.

When light is not generated from the light source unit 700, the unlit shape is implemented, and when light is generated from the light source unit 700, at least one or more lit shapes may be implemented. The description will be provided with reference to the following example.

Referring to FIG. 1B and FIG. 3, in an unlit state of the vehicle lighting apparatus 1 (a state in which light is not generated from the first light source portion 720 and the second light source portion 740 of the light source unit 700), a shape in which the pattern portions 540 of the inner lens 500 and the space between the pattern portions 540 are alternatively arranged may be seen to an external view of the vehicle.

Referring to FIG. 1B and FIG. 4, in a lit state of the vehicle lighting apparatus 1 (a state in which the first image 442 of the film portion 440 of the lenticular unit 400 is projected onto the reflector 600 by light emitted from the first light source portion 720 of the light source unit 700 and the pattern portion 540 of the inner lens 500 is illuminated by light emitted from the second light source portion 740 of the light source unit 700), the first image 442 seen through the lenticular unit 400, the first image 442 seen through the reflector 600, and the pattern portion 540 of the inner lens 500 may form a triangular arrangement, and may be seen by an external view of the vehicle.

Referring to FIG. 1B and FIG. 5, in a lit state of the vehicle lighting apparatus 1 (a state in which the second image 444 of the film portion 440 of the lenticular unit 400 is projected onto the reflector 600 by light emitted from the first light source portion 720 of the light source unit 700 and the pattern portion 540 of the inner lens 500 is illuminated by light emitted from the second light source portion 740 of the light source unit 700), the second image 444 seen through the lenticular unit 400, the second image 444 seen through the reflector 600, and the pattern portion 540 of the inner lens 500 may form a triangular arrangement, and may be seen by the external view of the vehicle.

As described above, the vehicle lighting apparatus 1 according to one embodiment of the present invention may implement various design images in the unlit state and the lit state by arranging the lenticular unit 400, the inner lens 500, and the reflector 600 in the triangular shape. Accordingly, the design characteristics of the vehicle may be improved, thereby increasing the marketability of the vehicle.

According to one embodiment of the present invention, a vehicle lighting apparatus can implement a design pattern in which a lenticular unit, an inner lens, and a reflector are arranged in a triangular shape to implement different images in an unlit state and a lit state, respectively. Therefore, the vehicle lighting apparatus can have the effect of increasing the design marketability of a vehicle.

Although the embodiments of the present invention have been described above, it is understood that one ordinary skilled in the art can make various changes and modifications to the present invention without departing from the spirit and scope of the present invention as hereinafter claimed. Further, it should be construed that differences associated with such changes and modifications fall within the scope of the present invention defined by the accompanying claims.

What is claimed is:

1. A vehicle lighting apparatus comprising:

a lenticular device;

an inner lens disposed in front of the lenticular device and inclined with respect to the lenticular device; and a reflector disposed on a lower side of the lenticular device and the inner lens, wherein the lenticular device, the inner lens, and the reflector are arranged in a triangular shape.

2. The vehicle lighting apparatus of claim 1, wherein a plurality of pattern portions spaced apart at predetermined intervals are disposed on the inner lens.

3. The vehicle lighting apparatus of claim 2, wherein the plurality of pattern portions are formed on the inner lens by etching treatment.

4. The vehicle lighting apparatus of claim 1, wherein the lenticular device includes:

a lens portion including a convex portion in which a plurality of convex shapes are continuously arranged and a flat portion disposed on one side of the convex portion; and a film portion disposed on the lens portion and configured to form at least one or more images that are alternatively arranged.

5. The vehicle lighting apparatus of claim 4, further comprising:

a light source including a first light source portion disposed at the rear of the lenticular device and a second light source portion disposed on an upper side of the inner lens, wherein, when light is not generated by the light source, an unlit shape is implemented through the vehicle lighting apparatus, and wherein, when light is generated by the light source, at least one or more lit shapes are implemented through the vehicle lighting apparatus.

6. The vehicle lighting apparatus of claim 4, wherein the reflector is configured to illuminate at least one or more images of the film portion of the lenticular device.

7. The vehicle lighting apparatus of claim 5, further comprising:

a housing configured to accommodate the lenticular device, the inner lens, the reflector, and the light source therein, wherein the housing includes:

a first frame portion disposed parallel to the lenticular device;

a second frame portion disposed parallel to the reflector; and a third frame portion disposed on an upper side of the first frame portion and configured to accommodate the second light source portion of the light source therein.

8. The vehicle lighting apparatus of claim 7, further comprising:

an outer lens disposed in front of the inner lens and the housing, and disposed parallel to the inner lens.

9. A vehicle lighting apparatus comprising:

a lenticular device;

an inner lens disposed in front of the lenticular device and inclined with respect to the lenticular device;

a reflector disposed on a lower side of the lenticular device and the inner lens; and a light source including a first light source portion disposed at the rear of the lenticular device and a second light source portion disposed on an upper side of the inner lens, wherein, when light is not generated by the light source, an unlit shape is implemented by the lenticular device, the inner lens, and the reflector, and wherein, when light is generated by the light source, one or more lit shapes are implemented by the lenticular device, the inner lens, and the reflector.

10. The vehicle lighting apparatus of claim 9, wherein the unlit shape or the one or more lit shapes is formed in a shape having at least two or more inclination angles.

* * * * *